United States Patent
Lowe et al.

(10) Patent No.: US 9,441,892 B2
(45) Date of Patent: Sep. 13, 2016

(54) STACKED HEAT EXCHANGER SYSTEM WITH SWING-OUT HEAT EXCHANGERS

(75) Inventors: Jared Jayson Lowe, Asbury, IA (US); Michael John Cocayne, Dubuque, IA (US); Steven Richard Sass, Dubuque, IA (US); Austin Edward Vize, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 1784 days.

(21) Appl. No.: 11/760,459

(22) Filed: Jun. 8, 2007

(65) Prior Publication Data

US 2008/0135209 A1   Jun. 12, 2008

Related U.S. Application Data (60) Provisional application No. 60/869,469, filed on Dec. 11, 2006.

(51) Int. Cl.
| | |
|---|---|
| *F28F 9/00* | (2006.01) |
| *B60K 11/04* | (2006.01) |
| *B60K 11/08* | (2006.01) |
| *F28D 1/04* | (2006.01) |
| *F28D 21/00* | (2006.01) |

(52) U.S. Cl.
CPC ............. *F28F 9/002* (2013.01); *B60K 11/04* (2013.01); *B60K 11/08* (2013.01); *F28D 1/0443* (2013.01); *F01P 2070/52* (2013.01); *F28D 2021/0094* (2013.01); *F28F 2280/105* (2013.01)

(58) Field of Classification Search
CPC .......... F01P 2070/52; F28F 2280/105; F28D 2021/0094
USPC ................. 165/41, 140, 67, 77, 86, 95, 916; 123/41.01; 180/68.4
See application file for complete search history.

(56) References Cited

U.S. PATENT DOCUMENTS

| | | | | |
|---|---|---|---|---|
| 2,253,438 | A | * | 8/1941 | Lutz .............................. 180/68.4 |
| 3,757,853 | A | * | 9/1973 | Daman ........................... 165/76 |
| 4,160,487 | A | * | 7/1979 | Kunze et al. ................. 180/68.4 |
| 4,541,645 | A | * | 9/1985 | Foeldesi ....................... 180/68.4 |
| 4,757,858 | A | * | 7/1988 | Miller et al. .................... 165/41 |
| 4,942,187 | A | * | 7/1990 | Kawata et al. ............... 523/200 |
| 5,009,262 | A | * | 4/1991 | Halstead et al. .............. 165/140 |
| 5,386,873 | A | * | 2/1995 | Harden et al. ................ 165/140 |
| 5,522,457 | A | | 6/1996 | Lenz |
| 6,076,488 | A | * | 6/2000 | Yamagishi ................. 123/41.49 |
| 6,105,660 | A | * | 8/2000 | Knurr .............................. 165/41 |
| 6,523,520 | B1 | * | 2/2003 | Chatterjea ................. 123/198 E |
| 6,732,784 | B2 | * | 5/2004 | Dion ............................... 165/41 |
| 6,880,656 | B2 | * | 4/2005 | Pfusterschmid et al. .... 180/68.4 |
| 6,966,355 | B2 | * | 11/2005 | Branham et al. ............... 165/41 |
| 2005/0211483 | A1 | * | 9/2005 | Pfohl et al. .................. 180/68.1 |

FOREIGN PATENT DOCUMENTS

| | | | |
|---|---|---|---|
| DE | 10347136 A1 | * | 4/2004 |
| EP | 1098073 A2 | * | 5/2001 |
| FR | 2808870 A1 | * | 11/2001 |

(Continued)

*Primary Examiner* — Travis Ruby
*Assistant Examiner* — Harry Arant
(74) *Attorney, Agent, or Firm* — Taft Stettinius & Hollister LLP; Stephen F. Root (57) ABSTRACT

A heat exchanger system for use with heavy equipment including a heat exchanger rotatable about a horizontal axis out of a frame.

12 Claims, 13 Drawing Sheets

(56) References Cited

FOREIGN PATENT DOCUMENTS

| | | | | |
|---|---|---|---|---|
| GB | 2184700 A | * | 7/1987 | |
| GB | 2355700 A | * | 5/2001 | |
| JP | 09011761 A | * | 1/1997 | |
| JP | 10220232 A | * | 8/1998 | |
| JP | 10266967 A | * | 10/1998 | |
| JP | 2001012244 A | * | 1/2001 | |
| JP | 2001041042 A | * | 2/2001 | |
| JP | 2002030693 A | * | 1/2002 | |
| JP | 2003146089 A | * | 5/2003 | |
| JP | 2003159932 A | * | 6/2003 | |
| JP | 2003193509 A | * | 7/2003 | |
| JP | 2003291662 A | * | 10/2003 | |
| JP | 2004278379 A | * | 10/2004 | |
| JP | 2006183399 A | * | 7/2006 | E02F 9/00 |
| WO | WO 2004099581 A1 | * | 11/2004 | |

\* cited by examiner

STACKED HEAT EXCHANGER SYSTEM WITH SWING-OUT HEAT EXCHANGERS

This application is related to U.S. Provisional application Ser. No. 60/869,469 filed Dec. 11, 2006, the disclosure of which is expressly incorporated by reference herein.

FIELD OF THE INVENTION

The present invention is related to a heat exchanger system for heavy equipment such as a motor grader or an agricultural tractor. Specifically, the present invention is related to a heat exchanger system with swing-out heat exchangers.

BACKGROUND OF THE INVENTION

Typically, heavy equipment such as motor graders and wheel loaders are powered by one or more diesel or gasoline powered internal combustion engines. Generally, these engines are liquid cooled, however, air or air/oil cooled engines may also be used. Most liquid cooled engines include a heat exchanger system, the heat exchanger system including a coolant pump and a fan cooled heat exchanger. The term cooler can be used interchangeably with heat exchanger. Coolant passes through the heat exchanger and is cooled by air flow created by the fan. The fan may be driven directly off of the engine or may be powered by any other suitable means such as electrically or hydraulically. Generally, the heat exchanger and fan are positioned relatively close to the engine to reduce the distance coolant is required to flow.

Most heavy equipment includes a hydraulic system having a hydraulic pump and at least one hydraulic cylinder used to actuate a component of the machinery such as a boom and/or a bucket. The hydraulic pump may also supply other components of the machinery such as the transmission and/or the cooling fan. The hydraulic system may also include a heat exchanger to cool the hydraulic fluid. This heat exchanger may be placed adjacent to or integral with the engine coolant heat exchanger described above. Generally, the engine cooling fan or a supplemental fan provides airflow over the heat exchanger to cool the hydraulic fluid.

Traditionally, manufacturers design systems that have heat exchangers stacked in front of each other, and/or placed next to each other in a side-by-side configuration. Today's cooling loads have greatly increased with the use of sophisticated transmissions, more air conditioners, and highly turbocharged engines. Vehicle space is at a premium because the number and size of components have increased, while the size of the enclosure has not changed. Some solutions have required manufacturers to increase the length of the heat exchanger system and have required service personnel to climb on the machine to service the heat exchanger system.

When heat exchangers are installed on heavy equipment, the heat exchangers may be subjected to vibration. In some applications it is useful to damp out these vibrations using vibrational isolators. Vibrational isolators absorb energy which may reduce the amount of damage done to the heat exchanger, which may prolong the useful life of the heat exchanger.

SUMMARY OF THE INVENTION

The present invention provides a heat exchanger system including a plurality of heat exchangers accessible for cleaning and service.

One embodiment of the present invention includes a heat exchanger system including a frame, a fan coupled to the frame, and a first non-fixed heat exchanger assembly coupled to the frame, the first non-fixed heat exchanger assembly located within a first plane, the first non-fixed heat exchanger rotatable about an axis transverse to the first plane.

Another embodiment of the present invention comprises a heat exchanger system including a frame, a non-fixed heat exchanger rotatable about a horizontal axis out of the frame, and a hinge assembly operably coupling the non-fixed heat exchanger to the frame, the hinge assembly including a vibration-isolated bushing.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Figure 1:
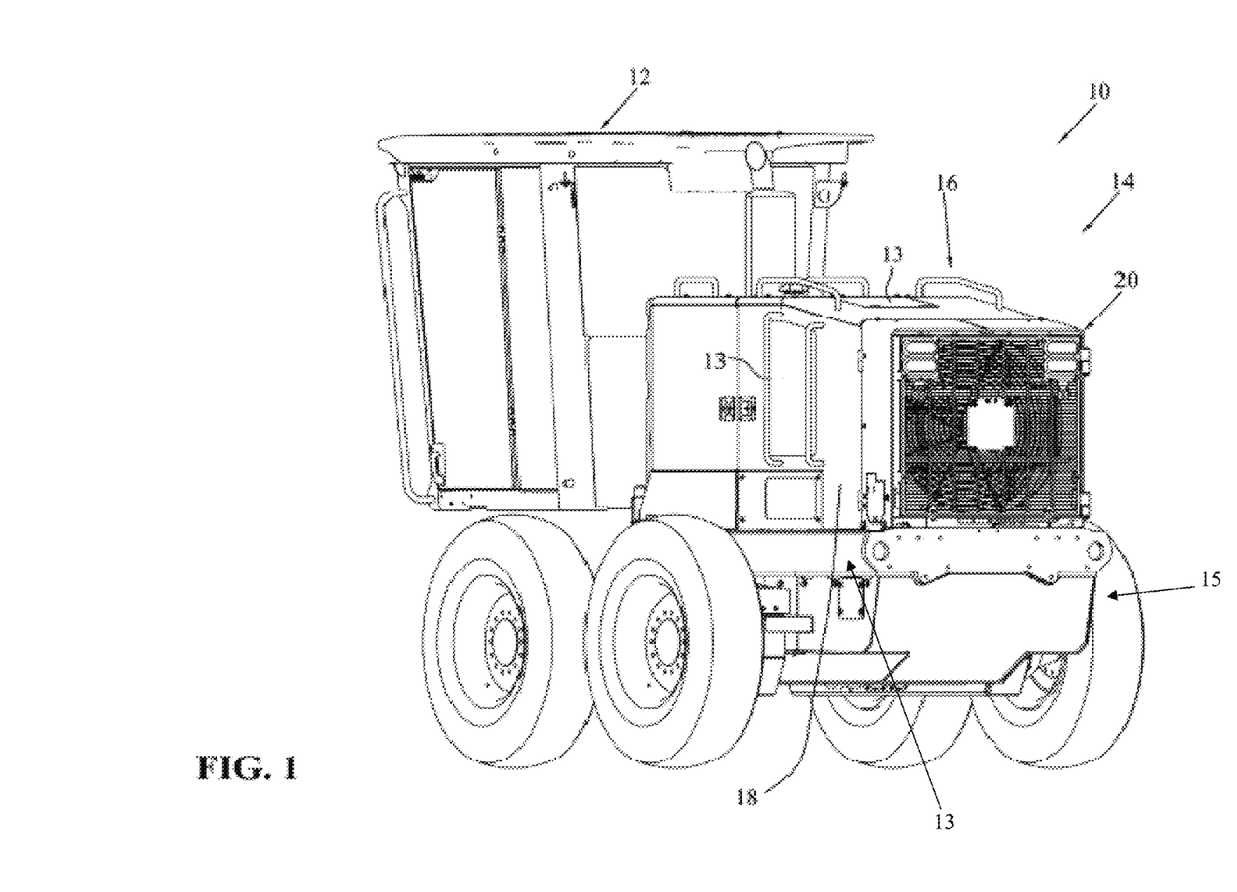
FIG. 1 is a partial perspective view of one embodiment of a rear portion of motor grader including a heat exchanger system.
Figure 1A:
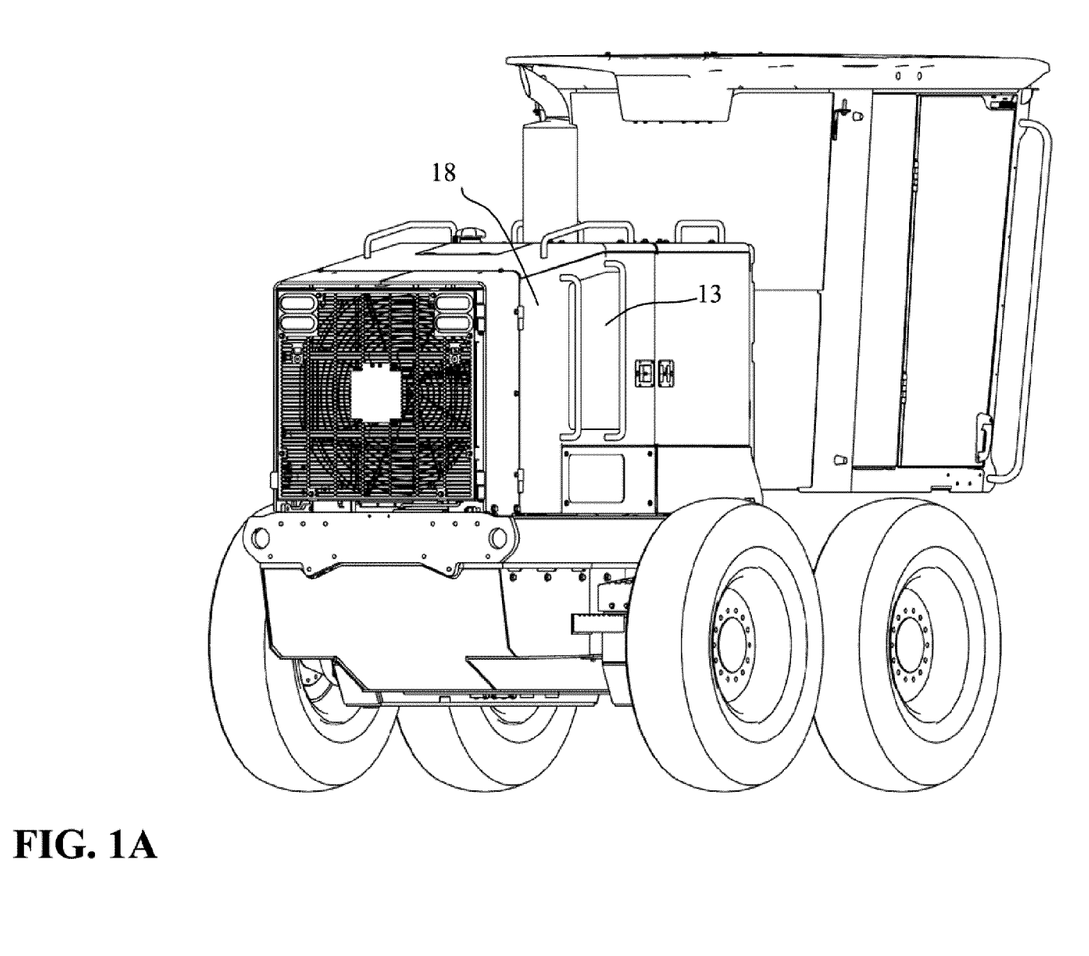
FIG. 1A is a perspective view of the heat exchanger system shown in FIG. 1.

Referring initially to FIG. 1, one embodiment of heavy equipment is shown. Rear engine and cab portion of motor grader 10 includes cab 12, an engine, a chassis 13, rear body 14, and a plurality of ground-engaging mechanisms 15. Back portion 16 of rear body 14 houses heat exchanger system 20. In this illustrative embodiment, back portion 16 includes rear door assembly 18 which may be rotated outward to allow access to internal components of motor grader 10. In the illustrative embodiment, only a single rear door assembly 18 is shown. However, it should be understood that any suitable arrangement of housing affecting access to the heat exchanger system and individual components thereof may be used.

Figure 2:
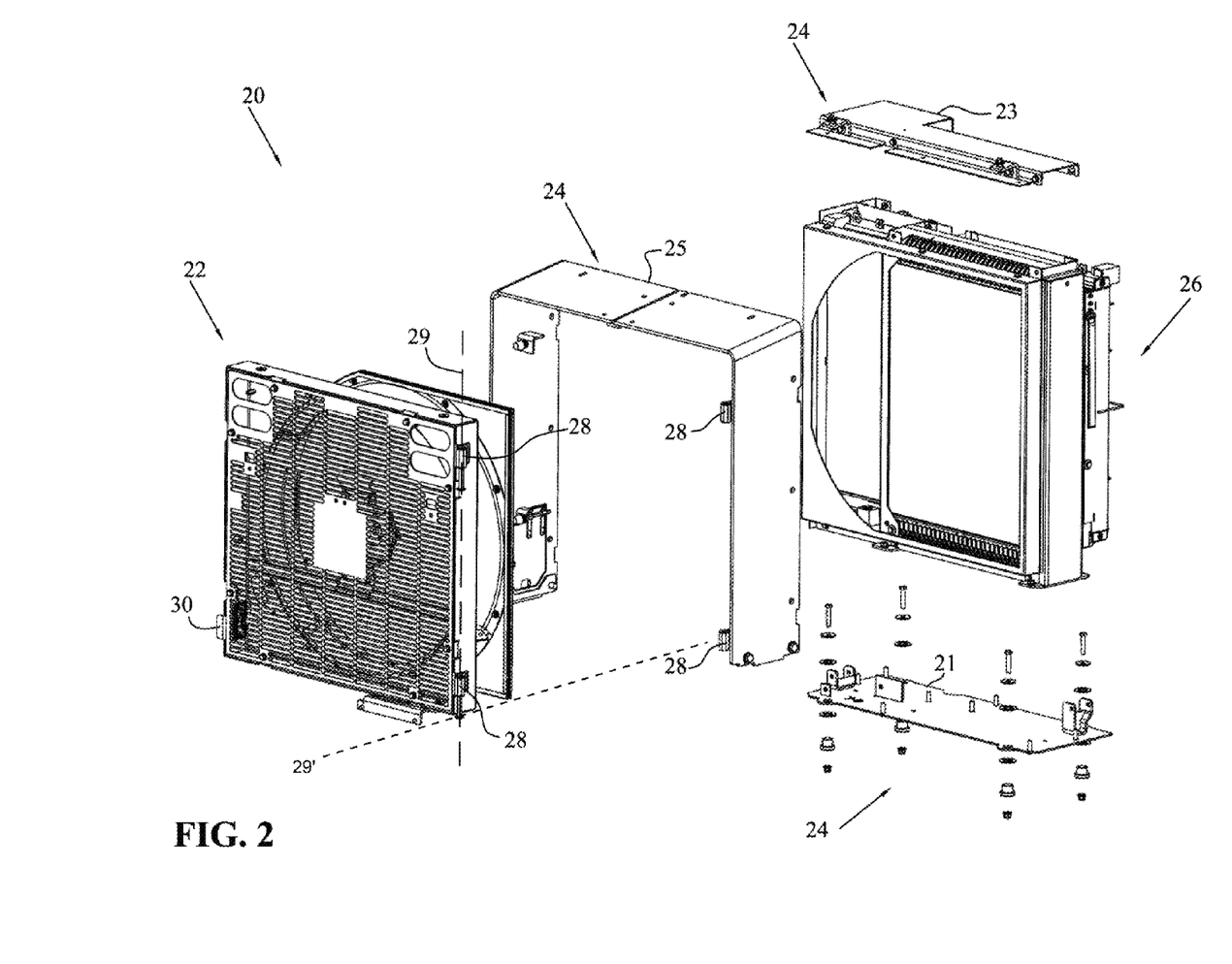
FIG. 2 is an exploded view of the heat exchanger system shown in FIG. 1.

Referring now to FIG. 2, an exploded view of heat exchanger system 20 is shown. Heat exchanger system 20 is supported by the engine frame (not shown) of the motor grader 10 (FIG. 1). Heat exchanger system 20 includes fan portion 22, frame portion 24 and heat exchanger portion 26. Frame portion 24 includes base plate 21, top plate 23 and frame housing 25. Frame housing 25 is supported by the engine frame (not shown) and is operably coupled to top plate 23.

As illustrated in FIG. 2, fan portion 22 pivotally couples to frame housing 25 by hinges 28. Hinges 28 allow for fan portion to pivotally move between open and closed arrangements. In this illustrative embodiment hinges 28 are shown, however it should be understood that any suitable pivotal coupler may be used. Therefore, in this illustrative embodiment, fan portion 22 is hinged about vertical axis 29, moving between open and closed positions. It should be understood that any suitable movement of fan portion 22 may be used, for example translation, rotation, pivoting, sliding or otherwise. Another example is where the fan portion 22 pivots about one point of a horizontal axis 29' along the longitudinal axis of the motor grader 10. Fan portion 22 may also include a fastening mechanism, illustratively shown as latching mechanism 30. Latching mechanism 30 may retain fan portion 22 in a closed position. In this illustrative embodiment a single latching mechanism 30 is shown, however, it should be understood that any number of latching mechanisms, for example for fastening fan portion 22 in different positions, may be used.

Heat exchanger portion 26 is coupled to base plate 21 and top plate 23. Therefore heat exchanger portion 26 is indirectly coupled to engine frame (not shown) and frame housing 25.

Figures 3, 4:
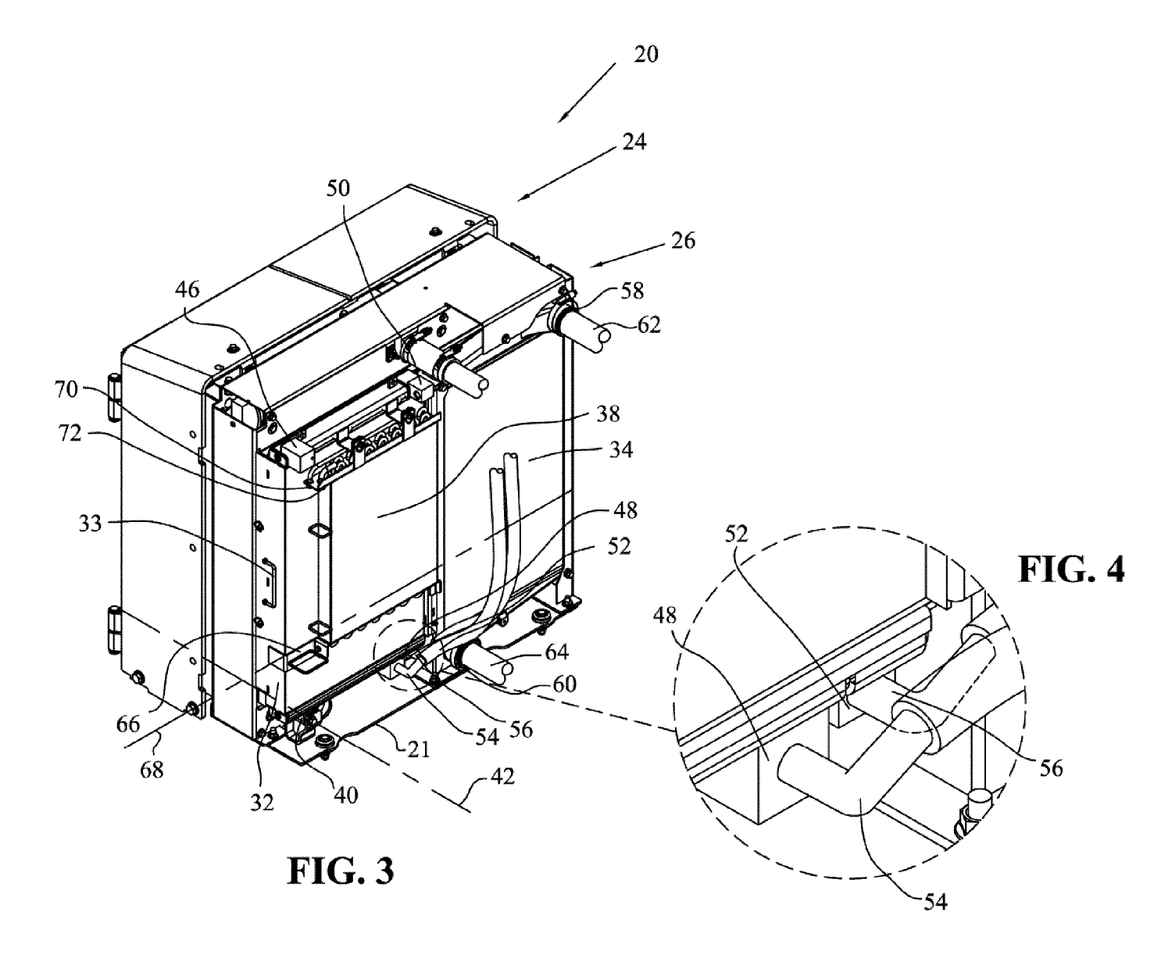
FIG. 3 is a perspective view of the heat exchanger system shown in FIG. 1.
FIG. 4 is a magnified view of a portion of the heat exchanger system shown in FIG. 3.

Referring now to FIG. 3, a perspective view of heat exchanger system 20 is shown. Heat exchanger portion 26 includes a plurality of heat exchangers including an intermediate non-fixed heat exchanger assembly 32, a forward fixed heat exchanger 34 and a forward non-fixed heat exchanger 38. There are several additional heat exchangers not shown in FIG. 3 which will be discussed later. Heat exchanger 32 is pivotally coupled to base plate 21 by hinge assembly 40, as discussed in greater detail below. Therefore heat exchanger 32 is rotatable about horizontal axis 42. Heat exchanger 32 and all other heat exchangers although described in the singular may include a plurality of heat exchanger units. Heat exchanger units may be used to cool fluids for systems of the heavy equipment, such as, for example: engine coolant, axle oil, air conditioner, hydraulic oil, charge air, transmission oil, or engine oil.

As illustratively shown in FIG. 3, heat exchanger 32 may include an axle oil heat exchanger (not shown) and a hydraulic oil heat exchanger (not shown). Heat exchanger 32 may also include handle 33, as shown. It is understood that handle 33 may include different types, such as pull, twist, or grip. Consistent with this illustration, heat exchanger 32 includes hydraulic connectors 46 and 48 and axle connectors 50 and 52. As best illustrated in FIG. 4, hydraulic hose 54 is removably coupled to hydraulic connector 48 and axle oil hose 56 is removably coupled to axle connector 52.

As shown in FIG. 3, hydraulic connectors 46 and 48, axle connectors 50 and 52 and frame portion connectors (not shown) rotatably couple to hydraulic hose 54, axle oil hose 56 and other first heat exchanger hoses (not shown). Three components may couple any of the disclosed hoses to any of the disclosed connectors. The connectors may include ports which may act as fluid conduits. The hoses may include end pieces to act as couplers. There may be a fitting to act as an adapter to couple the hose to the connector. The motion of the non-fixed heat exchangers may induce twisting or bending actions on the hoses. Suitable connectors may allow for the hoses to freely rotate during motion of the non-fixed heat exchangers. The ports, end pieces, or fittings may each allow for rotation of any of the disclosed hoses in relation to any of the non-fixed heat exchangers.

Suitable connectors include Snap-To-Connect (STC) connectors which are commercially available by Eaton Corporation, Eaton Center, 1111 Superior Ave, Cleveland, Ohio USA 44114-2584. Advantages of using suitable connectors include as features that hydraulic hose 54, axle oil hose 56 and other first heat exchanger hoses (not shown) return to their pre-rolled out state when heat exchanger 32 rotates about horizontal axis 42 and that non-fixed heat exchangers may be rotated from their operating position without disconnecting the hoses from the heat exchanger. When a non-fixed heat exchanger rotates about an axis, a hose with an STC connector coupled to the heat exchanger would not significantly twist. Twists may reduce the life of the hose. STC connectors rotate which eliminates twists in hoses preserving hose life.

Suitable hoses may be molded into a preferred position. A preferred molded position would help hoses return to their pre-rolled out state. Returning the hose to their pre-rolled out state may reduce the likelihood of a hose contacting a hot surface.

Figure 5:
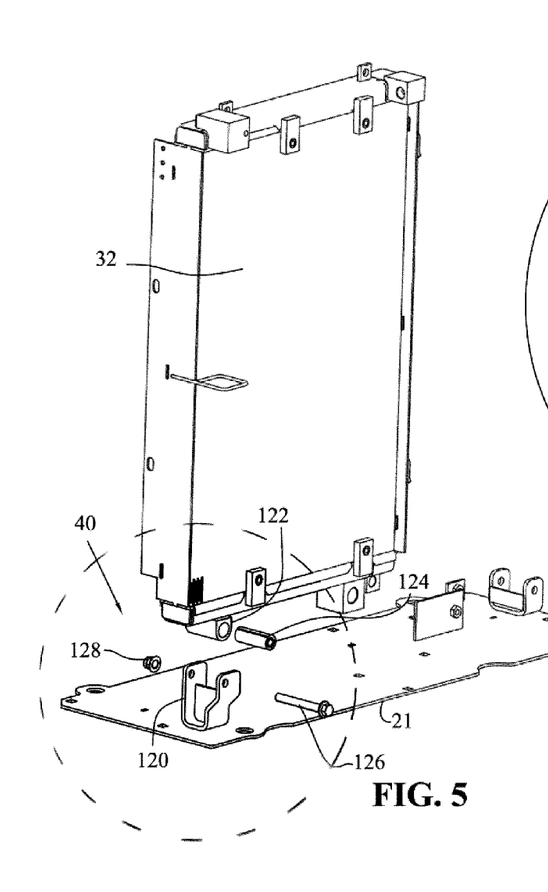
FIG. 5 is an exploded view of a portion of the heat exchanger system shown in FIG. 3.
Figure 6:
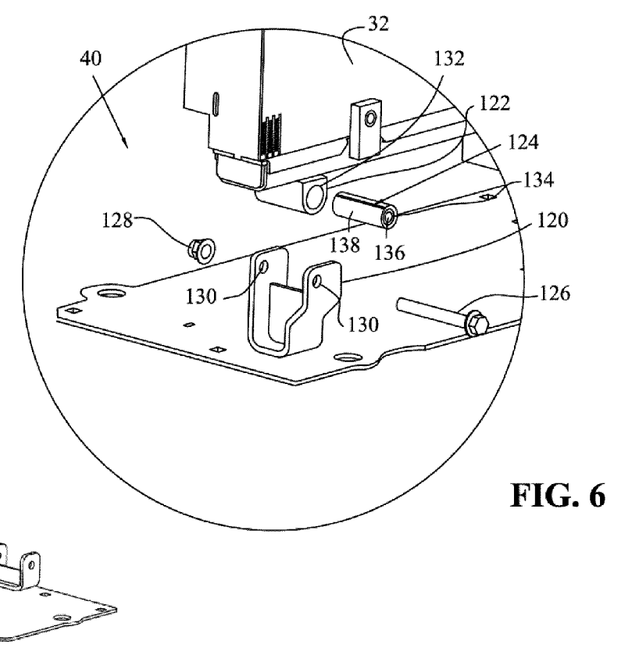
FIG. 6 is a magnified view of a portion of the heat exchanger system shown in FIG. 5.

As illustrated in FIGS. 5 and 6, hinge assembly 40 includes first fastener portion 120, second fastener portion 122, bushing 124, bolt 126 and nut 128. Hinge assembly 40 is adapted to be coordinated in any conventional manner. As illustrated in FIGS. 5 and 6, first fastener portion 120 is coupled to base plate 21 and adapted to receive bolt 126 through apertures 130 disposed along horizontal axis 42 (FIG. 3). In this illustrative embodiment, second fastener portion 122 is coupled to intermediate non-fixed heat exchanger 32. Second fastener portion 122 is also configured to receive bushing 124 and/or bolt 126 through aperture 132. First fastener portion 120 is also configured to receive second fastener portion 122, bolt 126 and/or bushing 124 disposed along horizontal axis 42 (FIG. 3).

As also illustrated in FIGS. 5 and 6, bushing 124 is adapted to receive bolt 126 through aperture 134. As shown in FIG. 6, bushing 124 may include first tube 136 and second tube 138. As illustrated, second tube 138 is concentric to first tube 136. As also illustrated, second tube 138 is concentric to first tube 136. First tube 136 may be comprised of steel, metals, alloys, or other rigid materials. Second tube 138 may be comprised of rubber, polymer, foam, resilient or other vibration isolating materials. As illustrated, resilient second tube 138 isolates second fastener portion 122 and therefore intermediate non-fixed heat exchanger 32. Resilient second tube 138 serves to absorb vibration associated with first fastener portion 120. It is understood that all non-fixed heat exchangers may have hinge assemblies similar to hinge assembly 40 including resilient second tubes to absorb vibration.

As illustrated in FIG. 3, forward fixed heat exchanger 34 is used to cool charge air. Consistent with this illustration, forward fixed heat exchanger 34 includes charge air connectors 58 and 60. Charge air connectors 58 and 60 are shown coupled to charge air hoses 62 and 64, respectively.

Still as illustrated in FIG. 3, forward non-fixed heat exchanger 38 is pivotally coupled to heat exchanger 32 by pivot system 66. It is understood that pivot system 66 may include different types of hinge assembly, such as pivot, butt/mortise, continuous (i.e. piano hinge), concealed hinge, butterfly (i.e., parliament), counterflap, flush, coach, rising butt, double action spring, tee, friction, security, cranked (i.e., stormproof), lift-off, or self-closing. It is also understood that forward non-fixed heat exchanger 38 could be coupled in other ways to heat exchanger 32, such as slidably coupled. Therefore forward non-fixed heat exchanger 38 is rotatable about axis 68. As illustrated axis 68 is horizontal. It is understood that axis 68 may be vertical or any other orientation between vertical and horizontal. As illustrated in FIG. 3, forward non-fixed heat exchanger 38 is used as a condenser for air conditioning (A/C). Consistent with this illustration, forward non-fixed heat exchanger 38 includes A/C connectors 70 and 72 respectively which are adapted to couple to A/C hoses (not shown). A/C hoses (not shown) can flex.

Figure 7:
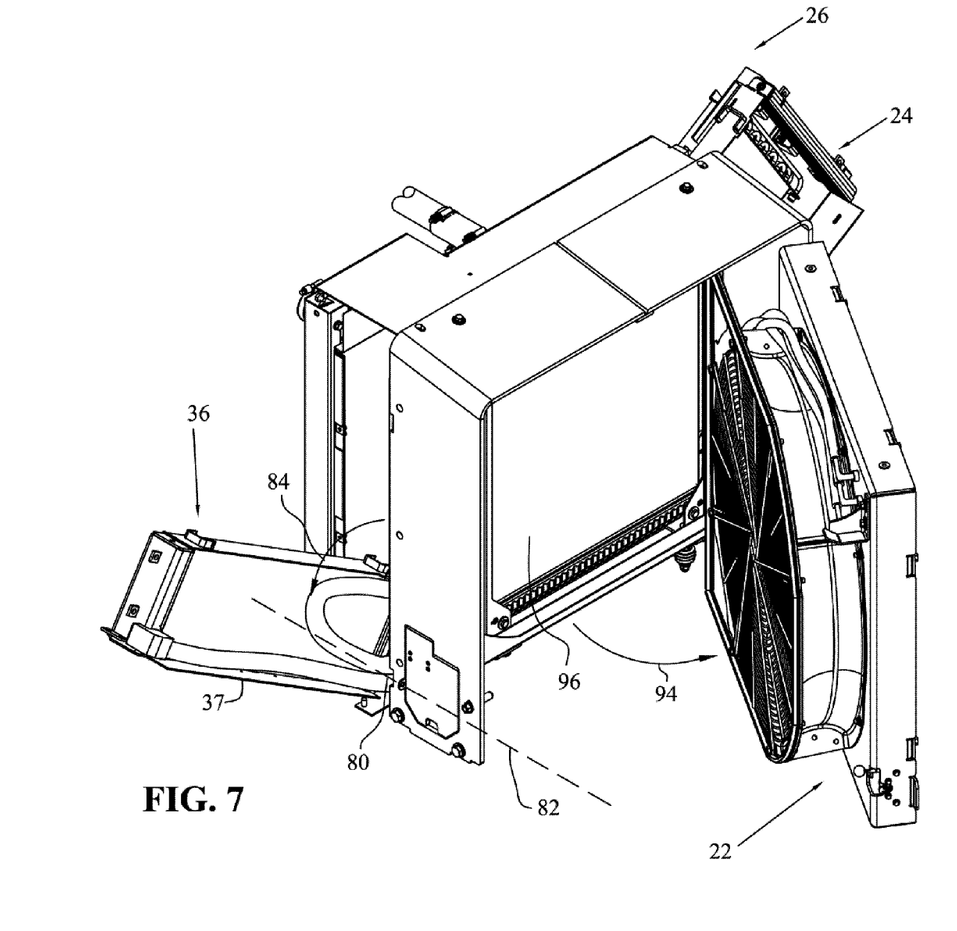
FIG. 7 is a perspective view of the heat exchanger system shown in FIG. 1 showing heat exchanger units partially rotated about horizontal axes and a fan portion rotated about a vertical axis.
Figure 10:
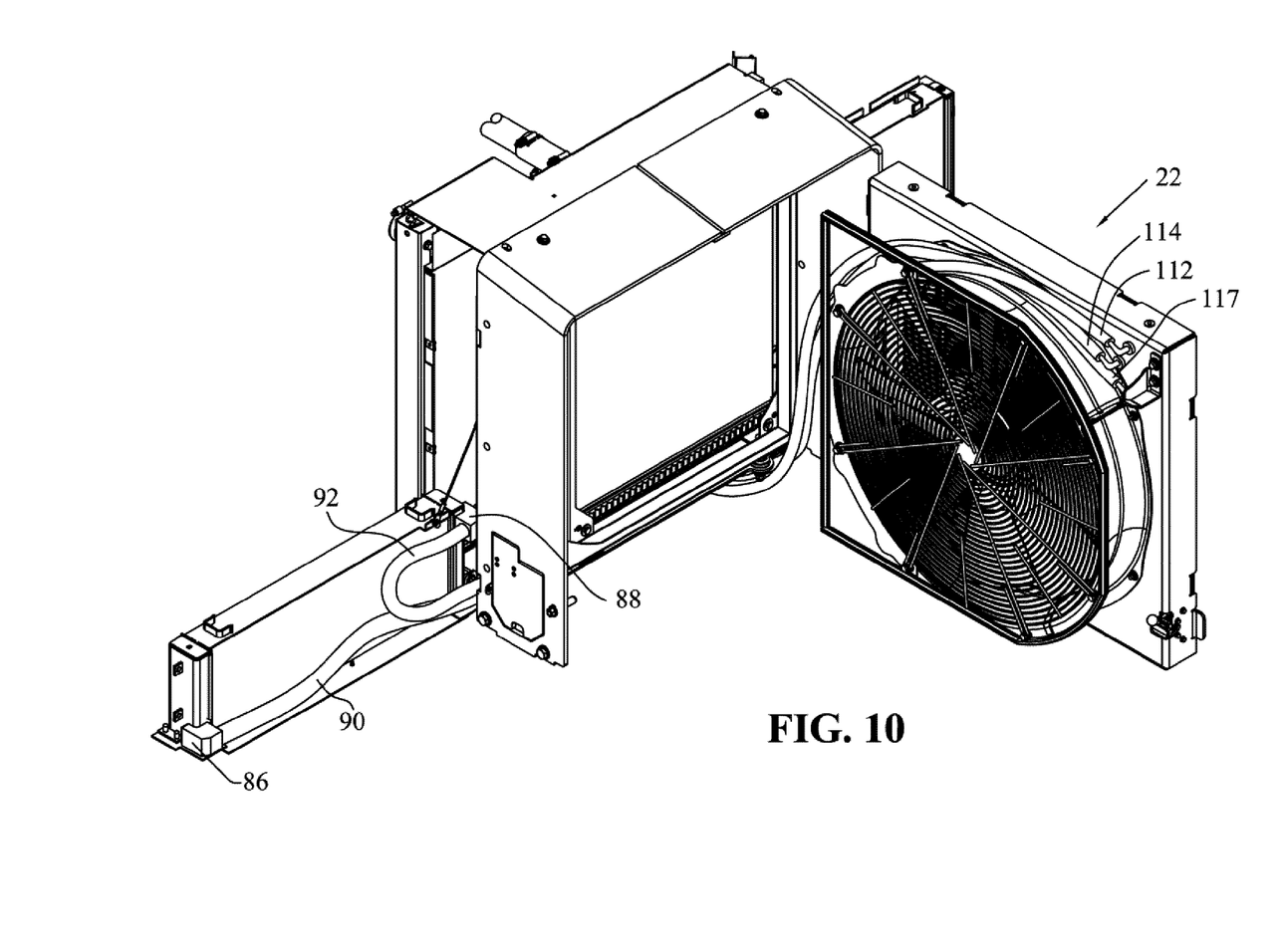
FIG. 10 is a perspective view of the heat exchanger system shown in FIG. 9.

Referring now to FIG. 7, heat exchanger portion 26 also includes a rearward non-fixed heat exchanger 36 including handle 37. It is understood that handle 37 may include different types, such as pull, twist, or grip. Rearward non-fixed heat exchanger 36 is pivotally coupled to base plate 21 (FIG. 3) by hinge assembly 80. Hinge assembly 80 is similar to hinge assembly 40 as previously described. Similar to heat exchanger 32, rearward non-fixed heat exchanger 36 is rotatable about horizontal axis 82. Rearward non-fixed heat exchanger 36 remains disposed about horizontal axis 82 during rotation, as illustrated by arrow 84. As illustrated in FIG. 7, rearward non-fixed heat exchanger 36 is used as a transmission oil heat exchanger. Consistent with this illustration, rearward non-fixed heat exchanger 36 includes transmission oil connectors 86 and 88 (FIG. 10). As best illustrated in FIG. 10, transmission oil connectors 86 and 88 are adapted to couple to transmission oil hoses 90 and 92. Transmission oil connectors 86 and 88 and frame portion connectors (not shown) couple to transmission oil hoses 90 and 92 while allowing transmission oil hoses 90 and 92 to rotate freely. Transmission oil connectors 86 and 88 and frame portion connectors (not shown) couple to transmission oil hoses 90 and 92 while allowing rotation. Suitable connectors include STC connectors which are commercially available by Eaton Corporation, Eaton Center, 1111 Superior Ave, Cleveland, Ohio USA 44114-2584. Suitable connectors enable transmission oil hoses 90 and 92 return to their pre-rolled out state when rearward non-fixed heat exchanger 36 rotates about horizontal axis 82 (FIG. 7) while the hoses remain in fluid communications with the heat exchanger.

Referring back to FIG. 7, fan portion 22 rotates along arrow 94. Still referring to FIG. 7, heat exchanger portion 26 also includes a rearward fixed heat exchanger 96. rearward fixed heat exchanger 96 is coupled to base plate 21 in a similar manner to forward fixed heat exchanger 34. As exemplified, rearward fixed heat exchanger 96 is used as a heat exchanger for engine coolant. Consistent with the illustration in FIG. 8, rearward fixed heat exchanger 96 includes heat exchanger connectors 98 and 100 shown coupled to heat exchanger hoses 102 and 104.

Figure 8:
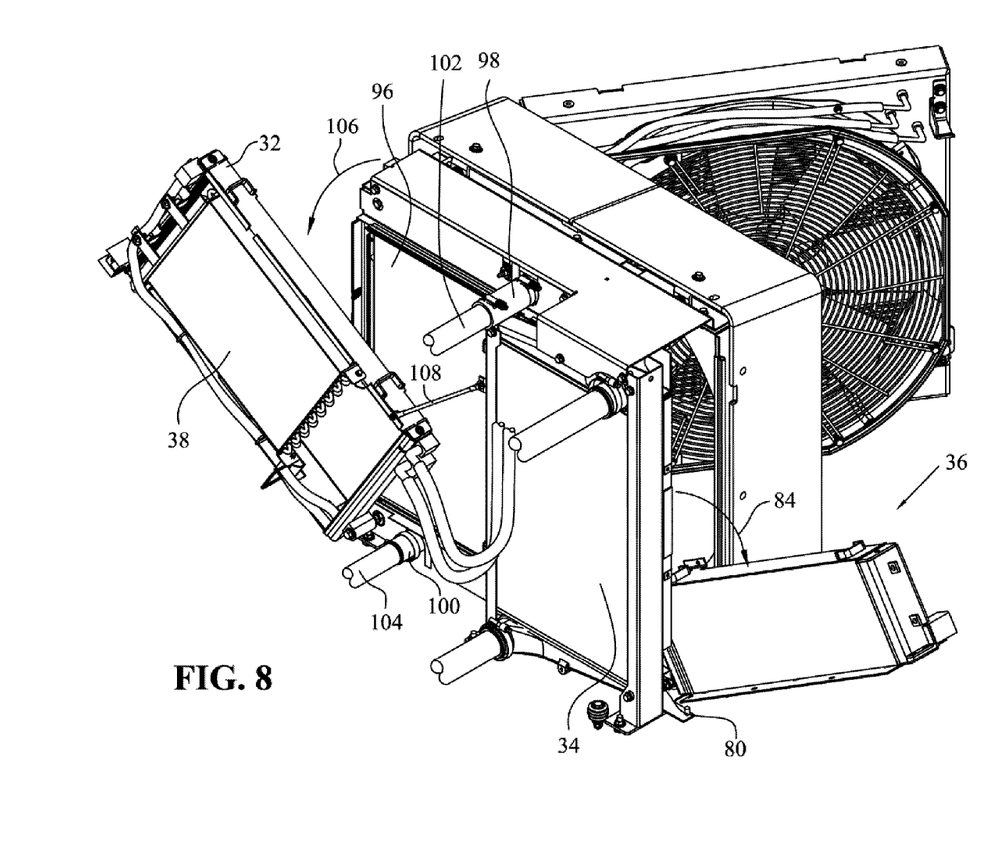
FIG. 8 is a perspective view of the heat exchanger system shown in FIG. 7.

Referring to FIG. 8, heat exchanger 32 and forward non-fixed heat exchanger 38 may rotate as indicated by arrow 106. Fastening member 108 prevents excess rotation and couples heat exchanger 32 to forward fixed heat exchanger 34. It is also understood that an alternative fastening member (not shown) similar to fastening member 108 may also couple heat exchanger 32 to frame housing 25 (FIG. 2) or rearward fixed heat exchanger 96.

Figure 9:
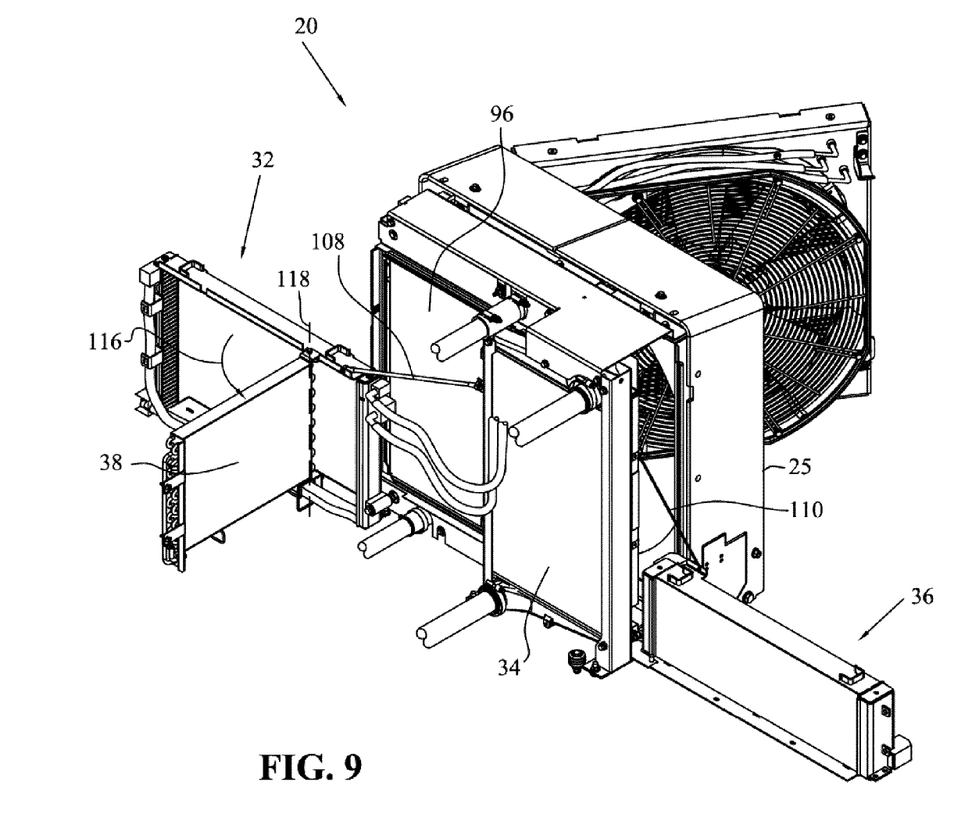
FIG. 9 is a perspective view of the heat exchanger system shown in FIG. 7 showing the heat exchanger units rotated on a horizontal axis and one heat exchanger rotated on a vertical axis.

Now referring to FIG. 9, heat exchanger system 20 is shown with intermediate, forward and rearward non-fixed heat exchangers 32, 38 and 36 rotated about horizontal axes 42 (FIG. 3) and 82 (FIG. 7) respectively and forward non-fixed heat exchanger 38 subsequently rotated about a vertical axis 118 along arrow 116. Also shown in FIG. 9, fastening member 110 prevents excess rotation and couples rearward non-fixed heat exchanger 36 to forward fixed heat exchanger 34. It is understood that an alternative fastening member (not shown) similar to fastening member 110 may also couple rearward non-fixed heat exchanger 36 to rearward fixed heat exchanger 96 or frame housing 25 (FIG. 2).

As illustrated in FIG. 10, fan portion 22 is hydraulically driven. Consistent with this illustration, fan portion 22 is adapted to couple to fan hoses 112, 114 and 117. Fan hoses 112, 114 and 117 may each independently represent supply hoses, return hoses or k-strain (also known as a leak off hose) hoses. Alternatively fan portion 22 may be electrically driven.

Figure 11:
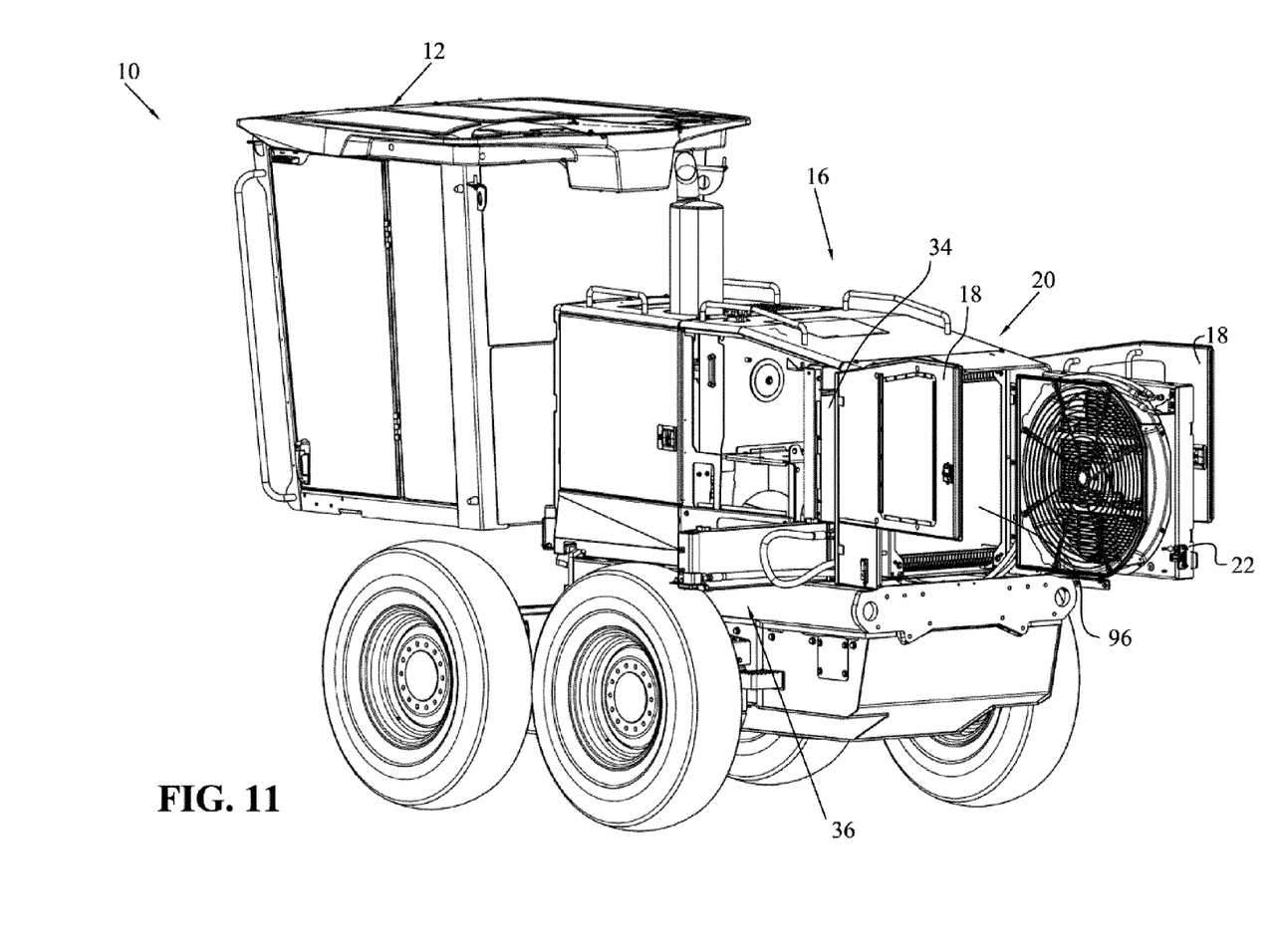
FIG. 11 is a perspective view of the rear portion of a motor grader shown in FIG. 1 with the heat exchanger units rotated on a horizontal axis.
Figure 12:
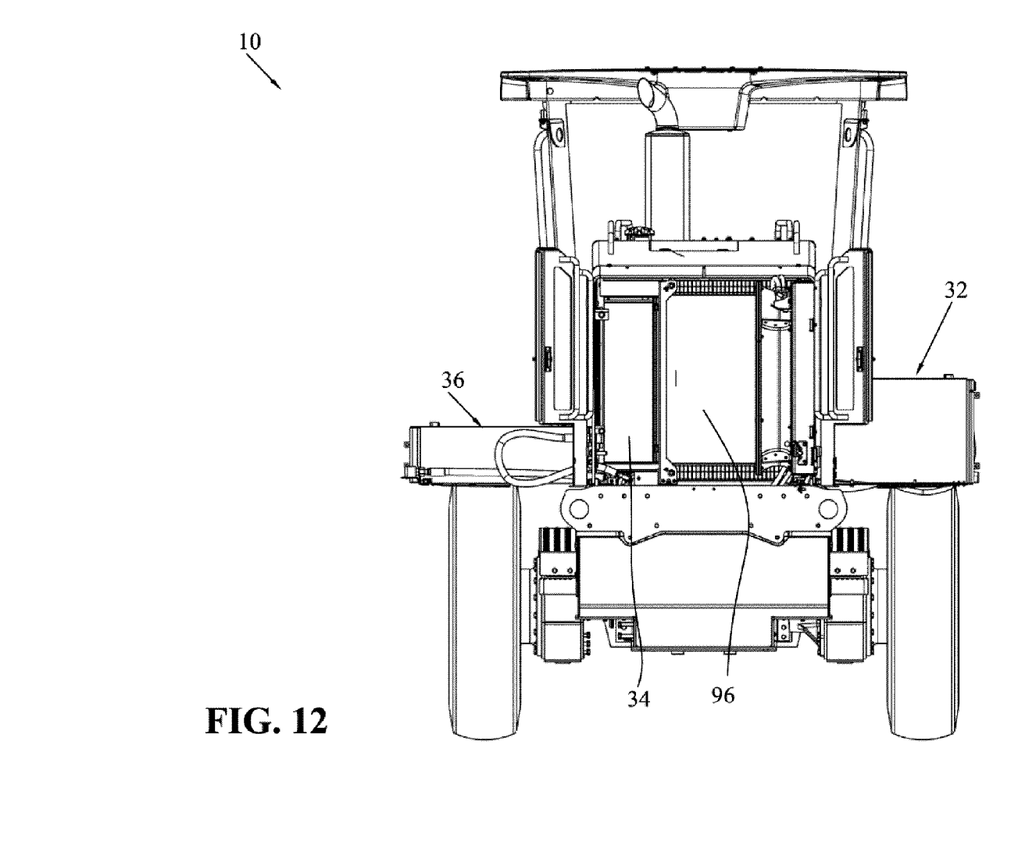
FIG. 12 is a rear view of the motor grader shown in FIG. 11.
Figure 13:
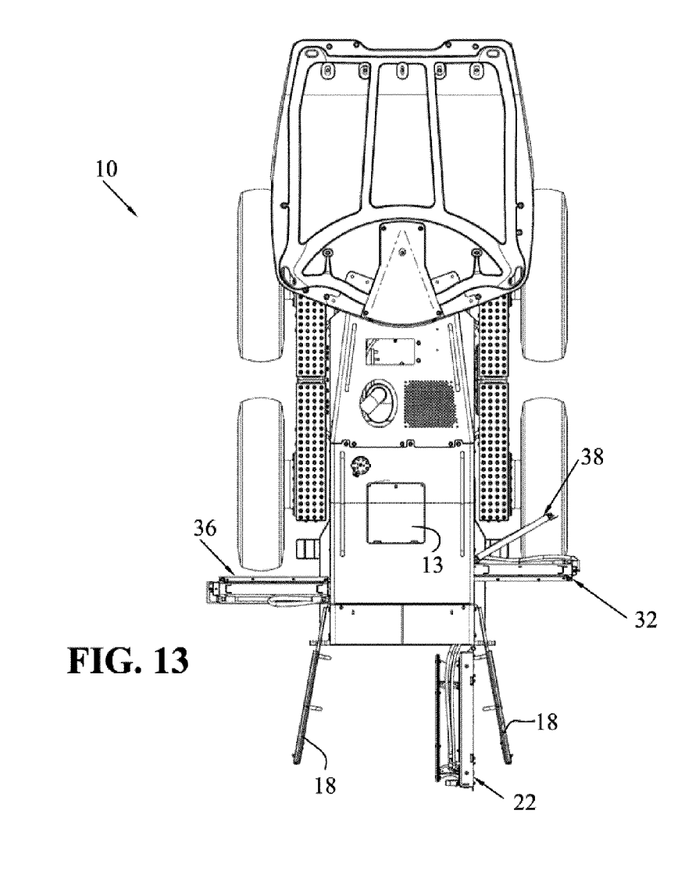
FIG. 13 is a top view of the motor grader shown in FIG. 11 with one heat exchanger rotated on a vertical axis.
Figure 14:
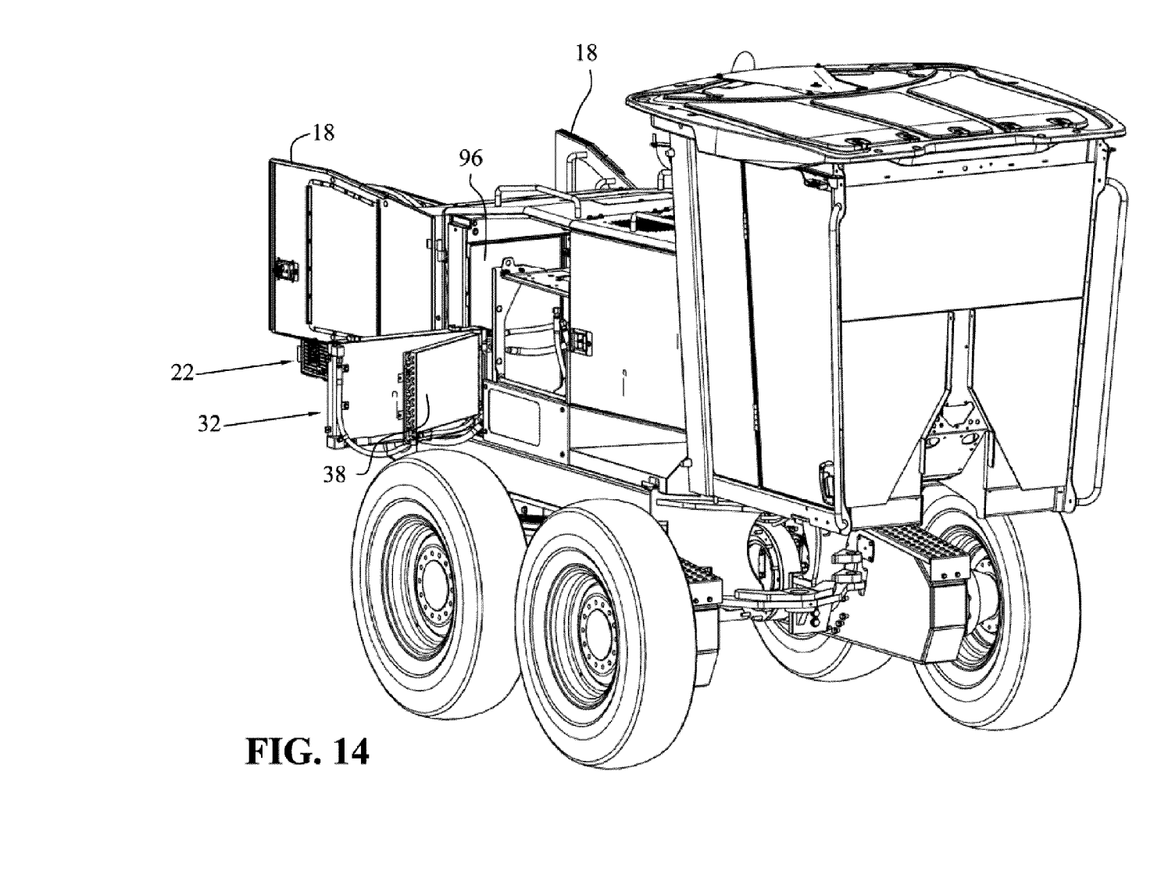
FIG. 14 is a partial perspective view of the rear portion of motor grader shown in FIG. 13.

Referring now to FIG. 11, a perspective view of back portion 16 of rear engine and cab portion of motor grader 10 is shown in an open arrangement. All faces of all heat exchangers including intermediate, forward, and rearward non-fixed heat exchangers 32 (FIG. 12), 38 (FIG. 14) and 36 and forward and rearward fixed heat exchangers 34 and 96 are easily accessible to an operator on ground level. Inspection, maintenance, and cleaning of these heat exchangers by the operator is very simple and easy as shown in FIGS. 11-14.

In operation, motor grader 10 and heat exchanger system 20 operate in the closed arrangement as shown in FIG. 1. Ambient air passes through all of the heat exchangers assisted by the fan portion 22. In one mode of operation, the ambient air is exhausted out of the rear of the motor grader 10 through the fan portion 22, illustrated as a rear mounted, hydraulically driven, reversible fan. In another mode of operation ambient air is drawn in the rear of the motor grader 10 through the fan portion 22 and passes through all of the heat exchangers.

While this invention has been described as having an exemplary design, the present invention may be further modified within the spirit and scope of this disclosure. This application is therefore intended to cover any variations, uses, or adaptations of the invention using its general principals. Further, this application is intended to cover such departures from the present disclosure as come within known or customary practice in the art to which this invention pertains.

What is claimed is:
1. A vehicle having a front end, a rear end, a first side, and a second side, the vehicle including:
   a chassis,
   a ground-engaging mechanism being configured to support the chassis, and a heat exchanger system coupled to the chassis and having a width defined in a direction perpendicular to a flow of air through the heat exchanger system, the heat exchanger system including:

a frame, a fan coupled to the frame, a first non-fixed heat exchanger assembly being configured for movement relative to the frame in a first direction beyond the first side of the vehicle, a second non-fixed heat exchanger assembly being configured for movement relative to the frame in a second direction opposite the first direction and beyond the second side of the vehicle, a first fixed heat exchanger assembly laterally adjacent the first non-fixed heat exchanger assembly such that the first fixed heat exchanger assembly and the first non-fixed heat exchanger assembly extend across the width of the heat exchanger system, the first fixed heat exchanger assembly being immovable relative to the flame, and a second fixed heat exchanger assembly laterally adjacent the second non-fixed heat exchanger assembly such that the second fixed heat exchanger assembly and the second non-fixed heat exchanger assembly extend across the width of the heat exchanger system, the second fixed heat exchanger assembly being immovable relative to the frame, the first and second non-fixed heat exchanger assemblies being arranged with the first and second fixed heat exchanger assemblies such that a cross-section across the width of the heat exchanger system includes at least one of the first and second non-fixed heat exchanger assemblies and at least one of the first and second fixed heat exchanger assemblies in a plane, the plane extending between the first side and the second side of the vehicle and in the direction perpendicular to the flow of air through the heat exchanger system.

2. The vehicle of claim 1, further comprising one or more hoses removably coupled to the at least one non-fixed heat exchanger assembly.

3. The vehicle of claim 2, further comprising a third non-fixed heat exchanger assembly, wherein one or more hoses are rotatably coupled to at least one of the non-fixed heat exchanger assemblies while at least one of the non-fixed heat exchanger assemblies rotates out of the frame.

4. The vehicle of claim 2, wherein one or more hoses are accessible to an operator on the ground.

5. The vehicle of claim 1, wherein the fan is adapted to draw air through the first non-fixed heat exchanger assembly in more than one direction.

6. The vehicle of claim 1 wherein the first side of the vehicle opposes the second side of the vehicle.

7. The vehicle of claim 1 wherein the at least one non-fixed heat exchanger assembly is pivotally coupled to the frame of the heat exchanger system.

8. The vehicle of claim 1 wherein the at least one non-fixed heat exchanger assembly is rotatable about a longitudinal axis of the vehicle.

9. The vehicle of claim 8 wherein the second non-fixed heat exchanger assembly is positioned longitudinally forward of the first non-fixed heat exchanger assembly.

10. The vehicle of claim 9 further comprising a third non-fixed heat exchanger assembly, the first non-fixed heat exchanger assembly is positioned forward of the second non-fixed heat exchanger assembly and rearward of the third non-fixed heat exchanger assembly.

11. The vehicle of claim 1, further comprising a third non-fixed heat exchanger assembly, the third non-fixed heat exchanger assembly is supported on the first non-fixed heat exchanger assembly and is movable beyond the first side of the vehicle when the first non-fixed heat exchanger assembly moves beyond the first side of the vehicle.

12. The vehicle of claim 1, wherein one of the first and second fixed heat exchanger assemblies are accessible when the fan and one of the first and second non-fixed heat exchanger assemblies are moved.

* * * * *